UNITED STATES PATENT OFFICE.

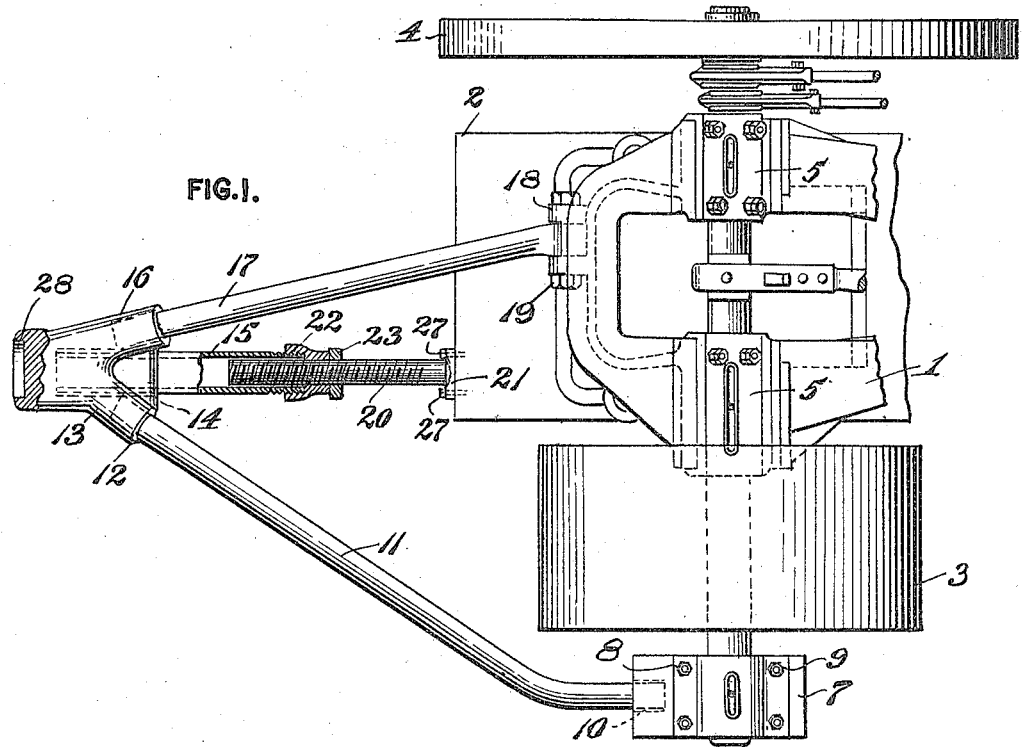

LOUIS C. SANDS, OF PITTSBURGH, PENNSYLVANIA.

COMBINED OUT-END BEARING AND BELT-TIGHTENING MEANS.

1,185,006.  Specification of Letters Patent.  Patented May 30, 1916.

Application filed August 1, 1913, Serial No. 782,449. Renewed November 16, 1915. Serial No. 61,857.

*To all whom it may concern:*

Be it known that I, LOUIS C. SANDS, a citizen of the United States, residing at Pittsburgh, in the county of Allegheny and State of Pennsylvania, have invented certain new and useful Improvements in Combined Out-End Bearing and Belt-Tightening Means, of which the following is a specification.

My invention relates to a combined out end bearing and belt tightening device for well drilling rigs, and its objects are to provide means to enable the engine to be moved for the purpose of tightening the belt without straining the engine shaft and to enable such means to be accommodated to different positions of the engine and bed.

With these objects and others in view, my invention is embodied in preferable form in the device hereinafter described and illustrated in the accompanying drawings.

In these drawings, Figure 1 is a plan view of an arrangement embodying my invention; and Fig. 2 is a side view in elevation.

Referring to the drawings, 1 is the engine bed and 2 is a block on which the engine bed is supported. This block is preferably made of wood and is adapted to be removably supported on mud sills as is usual. A pulley 3 by which the belt for operating the well drill is driven, a fly wheel 4, and boxes and caps 5 are mounted upon a shaft 6 of the engine.

In tightening the belt of an oil well drilling engine, it is the customary practice in the oil fields to place a jack intermediate the block 2 and the "bumper" which is customarily employed, and to then shift the engine on the block by means of the jack for the purpose of tightening the pulley against the belt. By this method of operation, the shaft of the engine is subjected to a twisting stress and is thereby weakened.

By my invention as hereinafter described, it is rendered possible to distribute the strain along the shaft and to move the shaft, engine and block as one unit, when the belt is to be tightened, thus eliminating any possibility of undue stress being placed upon the end of the engine shaft.

In accordance with this invention, the outer end of the shaft 6 is provided without end bearings 7, which comprise a lower bearing member and an upper cap, these two parts having sockets to fit the shaft and being clamped together by screw bolts 8 and 9. The bearing 7 embraces the shaft somewhat loosely, so as to be permitted an adjusting movement in a vertical plane. The bearing 7 is provided with a recess 10 in which fits one end of an arm 11, the other end of which arm projects loosely into a socket 12 of a sleeve 13.

The sleeve 13 is also provided with a central socket 14 into which projects the end of an arm 15 and with a socket 16 similar to socket 12 into which extends the end of an arm 17. The other end of the arm 17 projects into a plate 18 carried by the engine bed 1 and the arm is provided within the plate, with an aperture through which passes a bolt 19, by means of which connection, the arm 17 is enabled to move in a vertical plane.

The arm 15 is hollow and is provided with external threads. Adapted to project within the arm 15 is an adjustable screw threaded rod 20, which at its inner end is adapted to bear loosely against the curved face of a socket formed in a bearing member 21, secured directly to the block 2.

An internally threaded bushing 22 is mounted on the exterior of the inner end of the arm 15 and said bushing is adapted to coöperate with the threads of rod 20, thereby permitting a longitudinal adjustment of the arm 15. A lock nut 23 is mounted on the threaded rod 20 and serves to lock the rod, arm and bushing in position after the same have been adjusted. The plate 18 is secured to the engine bed by means of screw studs 24 and 25 and the socket plate 21 is similarly secured to the block 2 by means of screws or studs 26 and 27.

The sleeve 13 is provided with a recess 28 which is adapted to receive a jack whereby power may be applied to said sleeve to effect the tightening of the belt.

In the operation of the device, power being applied by a jack to the sleeve 13, for the purpose of forcing the engine inwardly so as to shift the pulley and thereby tighten the belt thereon, it will be seen that such power will be transmitted equally to the arms 11, 15, and 17, which arms are connected respectively to the out end bearing on the outer end of the shaft, to the foundation block and to the engine bed proper. As the sleeve is moved inwardly by the jack, the shaft, the engine, and the block will be moved together as a unit, thus preventing undue stress being exerted upon any part of the apparatus.

The sleeve 13 and the arms carried thereby, together with the out end bearing 7, thus constitute a strain distributing construction or brace member through which the power applied to the jack is transmitted to the various parts of the engine and its support with a uniform stress. By means of the pivotal bearing of the inner ends of the arms of this member, it is rendered possible to adjust the same to different vertical positions such as becomes necessary under different conditions in the use of a drilling engine.

In order to provide for differences between the relative positions of the engine 1 and the block 2 on different installations the longitudinally adjustable arrangement of the arm 15 and rod 20 is provided, and in order to adjust the strain distributing member to the engine and block, it is merely necessary to adjust the rod 20 and the arm 15 by means of the bushing 22 and lock nut 23, the lengths of the arms 11 and 17 being constant.

It is obvious that changes in the detail of construction of the device herein shown, within the scope of the appended claims, may be made without departing from the principle of the invention.

What I claim is:—

1. In a belt tightener, the combination with an engine, its shaft, its drive pulley and a foundation block for said engine, and a power-receiving member to move the block causing the engine to take up slack in the belt, said member having means extending therefrom and connected with the engine, the shaft and the block.

2. In combination with an engine, its shaft and a belt receiving pulley on said shaft, out end bearing on said shaft, of a belt tightener including a common member adapted to transmit power to the body of the engine and to the shaft and having means extending therefrom and connecting with said body and said out end bearing and adapted to engage a power applying mechanism.

3. In combination with an engine, its shaft and its foundation block, an out end bearing on said shaft, of shifting means therefor including a common stress distributing member having arms extending therefrom to engage respectively the engine body, the out end bearing and the foundation block and operable to receive power from a shifting means.

4. In combination with an engine and its shaft, and a foundation block for said engine, a belt engaging pulley on said shaft, of shifting means therefor including a common strain distributing member having means of separate connection with the bed of the engine with the shaft and with said block and operable to receive the application of power from a shifting device and means to permit the movement in a vertical plane of said stress distributing means.

5. In combination with an engine and its shaft and a foundation block, of shifting means therefor including a common strain distributing member having means of connection separately with the body of the engine, the engine shaft and said block, and means to adjust said member relatively to its distance from said parts.

6. In combination with an engine and its shaft and a foundation block for said engine, of shifting means therefor including a vertically adjustable common strain distributing member having means of connection with said parts and means for the application of a power device, and means to adjust said member relatively to its distance from said parts.

7. In combination with an engine and its shaft, a belt driving pulley on said shaft, an out end bearing rotatably mounted on said shaft, of a belt tightener including a strain distributing member having an arm connected with said out end bearing and having another arm pivotally connected with the body of said engine.

8. Belt tightening means including a stress distributing member adapted to be interposed between a shifting device and an engine and comprising a socket member having means to receive the application of power from said device and having separate arms socketed therein and extending to different parts of the apparatus to be shifted, one of said arms having means whereby the stress distributing member may be adjusted relatively to said parts.

9. In combination with an engine and its shaft and a foundation block for said engine, an out end bearing mounted on said shaft, a sleeve adapted to receive power from a shifting device, an arm extending from said sleeve and engaging said out end bearing, means to permit said arm to move in a vertical plane relatively to the shaft and arms extending from said sleeve and pivotally engaging the body of the engine and the foundation block, respectively, substantially as described.

10. In a belt tightener, the combination with a power-receiving member, rods engaging said member, one of which is provided with an out-bearing and the other of which is provided with means for engagement with an engine, and means also connected to the power-receiving member for engagement with an engine foundation block.

11. In a slack take-up for belts, a power-receiving member having diverging rods with engine engaging means, and an adjustable strut between said diverging rods.

12. A slack take-up comprising diverging rods, a power-receiving member to which said rods are connected and having means for engagement by a jack, and a strut interposed between said rods and connected to the power receiving member.

In testimony whereof I affix my signature in presence of two witnesses.

LOUIS C. SANDS. [L. S.]

Witnesses:
E. E. GREVE,
W. B. GLOVER.

Copies of this patent may be obtained for five cents each, by addressing the "Commissioner of Patents, Washington, D. C."